April 11, 1961    R. B. WIDTH    2,979,599
MULTIPLE ELECTRODE HOLDER
Filed May 12, 1959    3 Sheets-Sheet 1
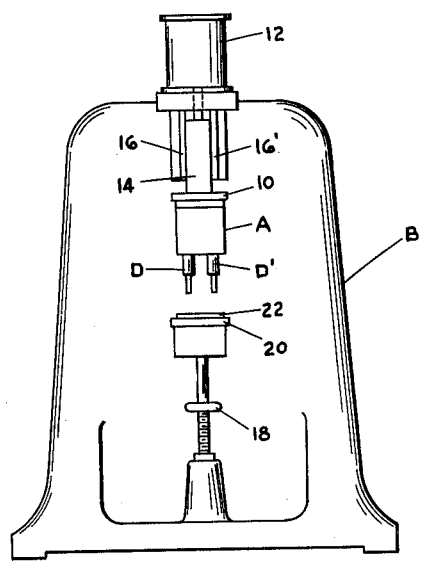
FIG. 1
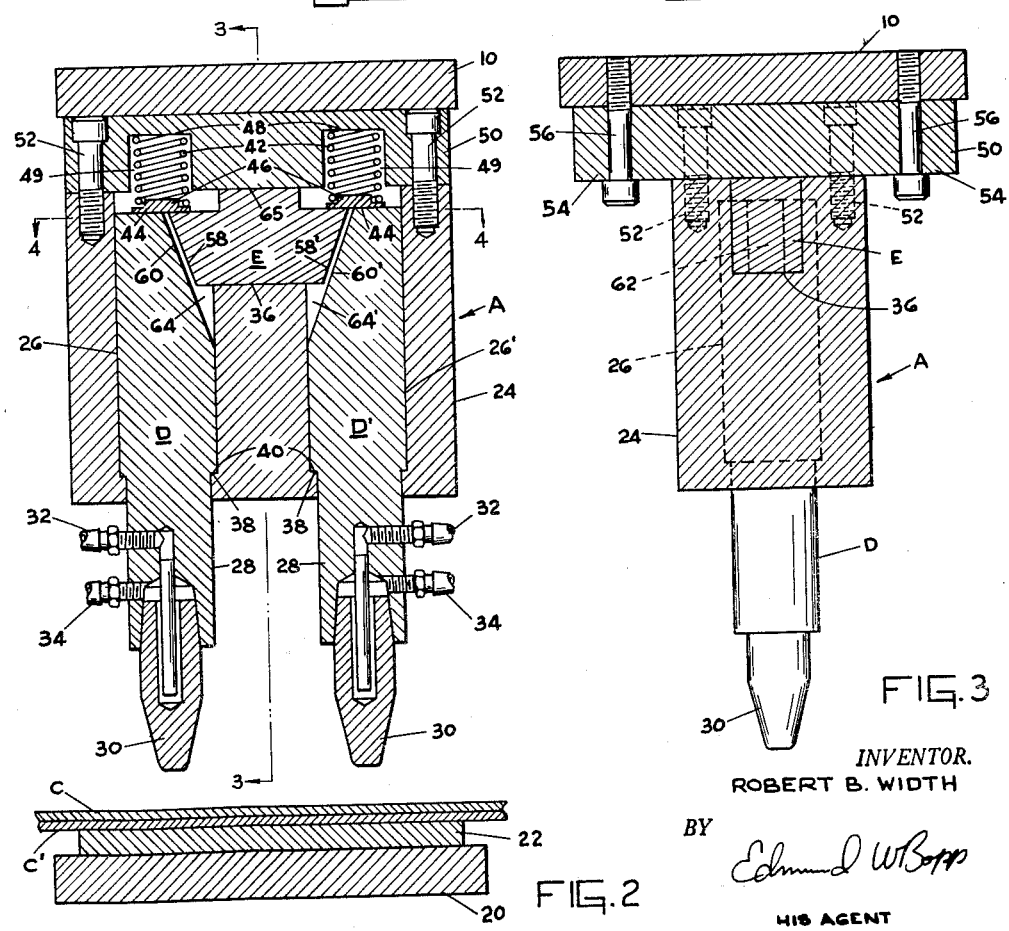
FIG. 2
FIG. 3
INVENTOR.
ROBERT B. WIDTH
BY Edmund W. Bopp
HIS AGENT April 11, 1961   R. B. WIDTH   2,979,599
MULTIPLE ELECTRODE HOLDER
Filed May 12, 1959   3 Sheets-Sheet 2

INVENTOR.
ROBERT B. WIDTH
BY
Edmund W Bopp
HIS AGENT

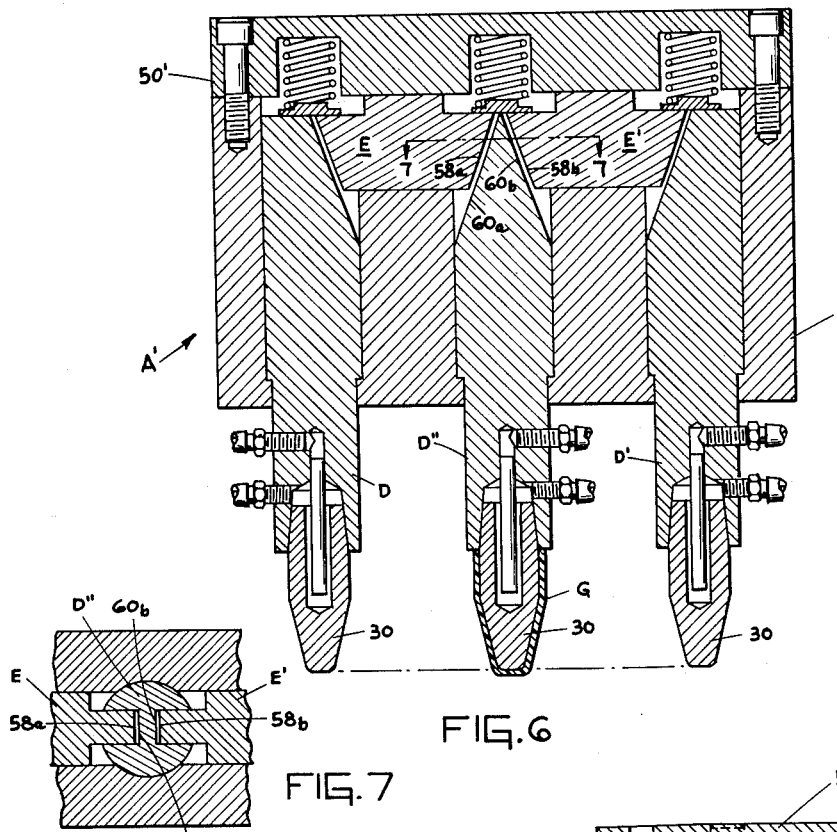
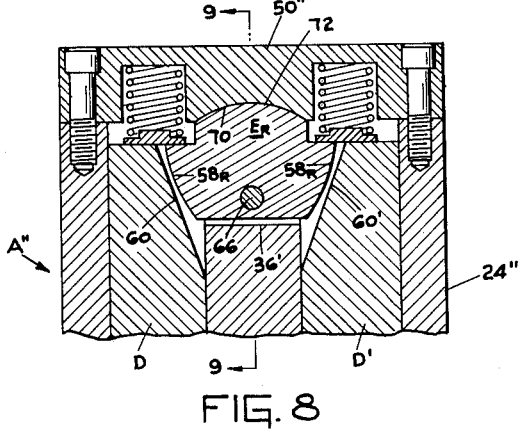
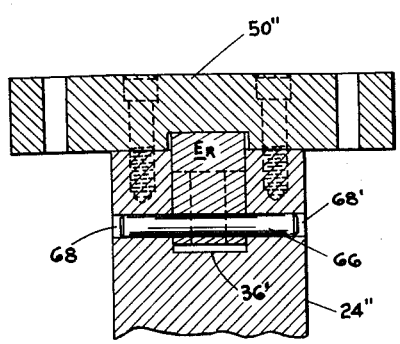

United States Patent Office 2,979,599
Patented Apr. 11, 1961

2,979,599

MULTIPLE ELECTRODE HOLDER

Robert B. Width, Rochester, Mich., assignor to Air Reduction Company, Incorporated, New York, N.Y., a corporation of New York Filed May 12, 1959, Ser. No. 812,689

12 Claims. (Cl. 219—87)

The invention relates to resistance welding, and is more particularly directed to improvements in multiple spot welding.

There are three general types of multiple spot welding machines, pressure-controlled, commutator-controlled, and multiple transformer. In the pressure-controlled type of machine, each gun or electrode holder is hydraulically connected through an air- or motor-operated distributor valve to a hydraulic pump, which actuates each gun in the desired sequence. At the same time a switch, synchronized with the valve, initiates the welding current with the movement of each gun. Though all of the guns are connected to a common bus bar and are energized at once, only the gun in contact with the work carries current. Thus, each gun is individually actuated to apply pressure independently of the other guns, and only the gun which applies pressure carries current.

In commutator-controlled machines, the guns are hyhydraulically connected by a single valve to a common header so that, in operation, all of the guns engage the work simultaneously under full pressure. Electrically, however, each gun is connected to a segment of a commutator-controlled switch so that welding current is fed to only one gun at a time.

In the multiple-transformer-type of machine, like the commutator-controlled type, welding pressure is also applied simultaneously by all of the guns. However, each gun, or a small group constituting a fractional number of the guns in the machine, is connected to an individual transformer so that while all the welds are made simultaneously, a plurality of current sources are necessary. As a result, this type of machine requires considerable electrical circuitry, with the attendant disadvantages of considerable wiring and many electrical connections.

An object of the invention is to provide a novel and improved means for simultaneously resistance welding a plurality of spaced areas at substantially equal welding pressure.

Another object of the invention is to provide means for multiple resistance welding wherein, in addition to applying substantially equal welding pressure at a plurality of spaced areas simultaneously, current is delivered to such areas and uniformly distributed from a single source to afford a plurality of simultaneously made welds with a minimum of electrical circuitry.

A further object of the invention is to provide a comparatively simple mechanical device, which is easily connected to the platen of a press type or to an arm of a foot-operated, air-operated or motor-operated rocker arm type of single spot welding machine, to enable simultaneously welding a plurality of spaced areas at substantially equal welding pressure and with the current uniformly distributed to such areas from the single current source of a standard single spot welding machine.

These, and other objects and advantages will be apparent from the following detailed description of several preferred embodiments of the invention, as illustrated in the drawings, in which:

Fig. 1 is a front view of a welding machine provided with a multiple electrode holder made in accordance with the invention;

Fig. 2 is a vertical cross-sectional view of the multiple electrode holder with relation to the work pieces in the neutral or disengaged position of the electrodes;

Fig. 3 is a vertical cross-sectional view taken approximately in the plane of line 3—3 of Fig. 2;

Fig. 6 is a vertical cross-sectional view showing a multiple electrode holder for the welding of more than two spaced areas, this view also illustrating the adaptability of the device for additionally serving as a hold-down fixture while simultaneously spot welding a plurality of spaced areas;

Fig. 7 is a horizontal cross-sectional view taken approximately in the plane of line 7—7 of Fig. 6;

Fig. 8 is a partial, vertical cross-sectional view of another embodiment of the invention; and Fig. 9 is a vertical cross-sectional view taken approximately in the plane of line 9—9 of Fig. 8.

Figure 4:
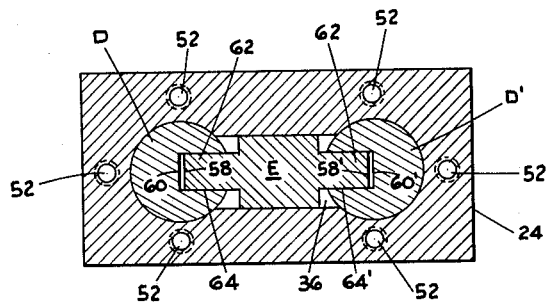
Fig. 4 is a horizontal cross-sectional view taken approximately in the plane of line 4—4 of Fig. 2.

As shown in Fig. 1, a multiple electrode holder made in accordance with the invention, designated A, may be attached to the upper platen 10 of a standard press-type of single spot welding machine B. As is well known in the art, such type of machine comprises an air or hydraulic cylinder 12 located above the welding head and connected to the upper platen 10 by a ram 14 reciprocable in the guide ways 16, 16'. The machine is provided with a jack screw 18 for the suitable positioning of the lower table or platen 20, upon which may be situated a common mandrel or bar 22 of high conductivity to serve as the lower electrode. The work, or metal sheets to be welded C and C' (Figs. 2 and 5) are positioned on the lower electrode. As is common in such type of welding machine, flexible bands, and upper and lower terminals are provided for connection to the transformer secondary (not shown) to conduct current to the upper and lower platens.

It will be understood that while the multiple electrode holder A of the invention is here illustrated in conjunction with a press type of resistance welding machine, spot or projection welding, the holder may be attached to the rocker arm or the lower arm of a foot-, air-, or motor-operated single spot welding machine, it only being necessary to select a machine of sufficiently high rating to furnish the desired pressure and current for the number of electrodes carried by the multiple electrode holder.

In accordance with the invention generally, and in common with the several illustrated embodiments thereof, the multiple electrode holder A comprises a body 24 made of a suitable electrically-conductive metal, such as a copper alloy. The body is provided with a pair of spaced, parallel bores 26 and 26' which extend through the body in a direction parallel to the direction of pressure application when welding. Resiliently mounted, electrically-conductive, piston-like electrode holders D and D' of substantially equal length are disposed in each of said bores. A portion 28 of each holder, adjacent the end to which the welding tip 30 or electrode is secured, extends beyond the body. The tip or electrode may be of the straight or offset variety, and may be secured to the holder in any suitable manner. As shown, the tips are provided with a Morse taper, and the end of each electrode holder is matingly recessed to receive and secure the tip in position. The use of off-set tips permits varying the spacing between welds with a multiple holder of the invention have predetermined spacing between its individual holders. As is well known in the art, fittings 32 and 34 are connected to passages formed in the electrode holders at their protruding portions 28 for the circulation of a coolant for the welding tips.

The body 24 is provided with a slot 36 extending transversely between and in communication with the spaced bores 26 and 26'. A pressure-equalizing cam E is positioned in the slot and confined therein for movement between and engagement by the spaced, resiliently mounted electrode holders D and D'.

In operation, and when the welding tips supported in the spaced, piston-like, resiliently mounted electrode holders are brought into pressure engagement with the work pieces to be welded, the electrode holders D and D' adjustably relate themselves into engagement with the intermediate cam E so that the pressure exerted upon and by the electrode holders in the direction of welding pressure is substantially equal for the respective electrode holders. Also, and at the same time, pressure of substantially equal magnitude is exerted upon the respective holders in a direction transversely of the direction of welding pressure. As a result, the peripheries of the electrode holders are urged into equal pressure engagement with the adjacent portion of the body providing the wall of the bore for each of the electrode holders to furnish firm contact of the electrically-conductive body and electrode holders for the uniform distribution of current to the welding tips during the current applying portion of the welding cycle.

In greater detail, and referring to Figs. 2 to 5 which illustrate one embodiment of the invention, a pair of spaced electrode holders D and D' are disposed in the bores 26 and 26' of the body 24. The electrode holders are cylindrical in shape and fit within their respective bores with a close fit, though allowing free reciprocable movement of the holders. The body is counterbored to provide a circumferential shoulder or stop 38 to limit the lowermost position of the electrode holders with respect to the body. The electrode holders are each formed with a coacting shoulder 40. Each of the electrode holders is resiliently maintained against the stop 38 by resilient means 42 therefor, which in the neutral position of the device as shown in Fig. 2, maintains the holders out of coacting engagement with the pressure-equalizing cam E, that is to say, the cam is free to move between the holders.

As shown, the resilient means 42 is preferably in the form of a compression spring having one end thereof exerting pressure upon the upper end 44 of the electrode holder, an individual spring, of course, being provided for each holder. An annular bearing washer 46 is positioned between the upper end 44 of the electrode holder and the spring. The washer is preferably formed with an upstanding central boss, which is received within the inner diameter of the spring to position the spring in alignment with the central longitudinal axis of the electrode holder. The opposite end of each spring bears against a wall 48 located at the base of a recess 49 formed in a cap 50. The cap, which is an electrically-conductive plate, is tightly secured to the electrically-conductive body 24 by a plurality of bolts 52 extending through the cap and into tapped holes provided in the body. The cap 50 serves to confine the movement of the pressure-equalizing cam E between and for engagement by the pair of electrode holders D and D'. As shown in Fig. 3, the cap is dimensioned to provide laterally extending sides 54, to permit the firm connection of the cap, and thereby the entire multiple electrode holder assembly A, to the welding machine's upper platen 10 by a plurality of bolts 56. When the multiple electrode holder assembly is used in conjunction with a rocker-arm type of machine, the cap is provided with an internally threaded bore extending into the top at the center thereof to receive the threaded and current-carrying shank extending from the arm.

The pressure-equalizing cam E, which may also be made of electrically-conductive metal, is symmetrical in configuration and has a pair of cam faces 58 and 58' at opposite sides thereof for coaction with mating cam faces 60 and 60' provided by the electrode holders D and D', respectively. As more clearly shown in Fig. 4 the cam faces 58 and 58' are provided on a pair of oppositely and transversely extending tongues 62 and 62' which are received in grooves 64 and 64', respectively, formed in the electrode holders. The tongues have a height less than the overall height of the cam to furnish room for the desired positioning of the springs 42 and their bearing washers 46, while allowing the upper surface 65 of the cam to be engaged by the cap 50. The grooves 64, 64', the base walls of which constitute the electrode holder cam faces 60, 60' face the cam slot 36, and are formed to extend at an angle from a point inwardly of the periphery of the holder toward its periphery, as shown in Figs. 2 and 4. The angle of each of the cam faces 60 and 60' is preferably between approximately 20 and 30 degrees with respect to the longitudinal axis of the holder. The cam faces 58 and 58' extend at a corresponding or mating angle.

Figure 5:
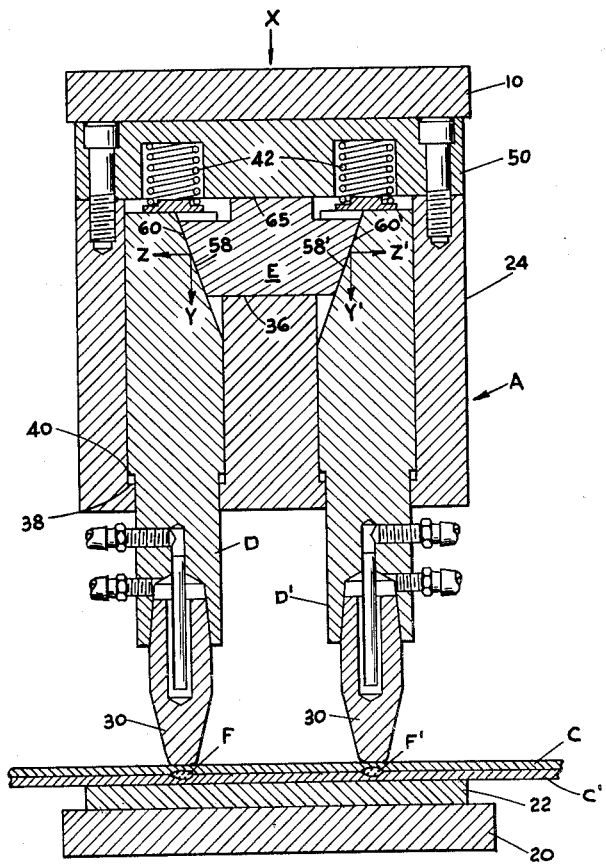
Fig. 5 is a view similar to Fig. 2, but showing the electrodes in pressure-engaging and welding position.

When the welding tips 30, supported within their respective holders D and D', are brought from the position shown in Fig. 2 to the position of engagement with the work pieces C and C', the holders, against the resilient forces supplied by their respective springs 48, are pressed against the pressure-equalizing cam E at the coacting cam faces 58, 60 and 58', 60'. If one electrode holder, for example electrode holder D, engages the cam before the cam is engaged by the electrode holder D', the cam is transversely shifted toward the holder D'. Similarly, if the holder D' first engages the cam, the cam is shifted transversely toward the holder D. By virtue of the described relationship of the parts, the cam quickly adjusts itself between the two holders so that the holders, as shown in Fig. 5, become symmetrically related with respect to the cam. Though there is a slight clearance between the cam and the confining sides thereof in a vertical plane; namely, the bottom wall of the cam slot 36 and the adjacent lower surface of the cap 50, the top surface 65 of the cam is pressed into firm engagement with the cap, and the pressure exerted between the cam faces 58 and 60 is equal to the pressure between the cam faces 58' and 60'. Due to the equal and angular disposition of the respectively coacting cam faces, the application of welding pressure to the multiple electrode holder assembly A, in the direction of the arrow X as shown in Fig. 5, is translated into two components of pressure upon each of the holders. Firstly, there are the parallel and equal components of pressure Y and Y' in the direction of welding pressure. Secondly, the electrode holders have imparted thereto oppositely directed transverse components of pressure in the direction of the arrows Z and Z', which cause equal and firm pressure engagement between the peripheries of the respective holders and the body at the sides of the holders opposite the sides engaged by the cam. The transverse components of pressure imposed upon the holders are also equal to one another, and establish the desired electrical contact for the uniform distribution of current from the source through the platen 10, the cap 50, the body 24, the holders D and D', and to their respective electrodes 30. If desired, the periphery of each holder may be silver-plated to furnish better electrical conductivity between the holders and the body. As a result, and as shown in Fig. 5, a pair of welds F and F' are made simultaneously, with the application of equal welding pressure and the uniform distribution of current to the weld areas. After welding, the multiple electrode holder A is retracted to the position shown in Fig. 2 for the next welding cycle, the holders, at the urging of their springs, returning to the position limited by the engagement of the shoulders 40 with stops 38.

Figs. 6 and 7 illustrate a holder assembly A' for making more than two welds at a time. Although the multiple electrode holder, designated A', shows three electrode holders, it will of course be understood that the arrangement may be expanded to include any desired number of electrodes. With the electrodes D, D' and D" in linear alignment as shown, the number of pressure-equalizing cams used is one less than the number of electrode holders. With three holders, two cams E and E' are used; with four holders, three cams are used in linear arrangement, and so on. The relationship of the parts is essentially the same as hereinbefore illustrated and described with respect to an assembly for a pair of holders, except that the holders intermediate the end holders in the line, in this instance the holder D", has cam faces, designated $60_a$ and $60_b$, at diametrically opposite sides thereof for coaction with the cam face $58_a$ on one cam and the cam face $58_b$, respectively, of another cam. Similar parts of the assembly are designated with the same reference numerals as in the showing of Figs. 2 to 5, except that the numerals are primed.

Fig. 6 also illustrates that a multiple electrode holder made in accordance with the invention may be simply adapted to additionally serve as a hold-down fixture. One of the electrode holders, for example the electrode holder D", may be insulated with respect to the adjoining body so that no current is delivered thereby. The holder is made of a length so that the work is engaged and held before the welding tips which carry current down into equalized pressure welding engagement with the work. A comparatively simple way to obtain the hold-down fixture feature, and to prevent the passage of current to the work at such area of insulated pressure engagement is to provide, as shown, a removable cover G of insulating material, such as Teflon, of suitable thickness for the usual welding tip at the end of a holder being used for this purpose.

Instead of a cam, or cams, being mounted in the device for linear movement between the electrode holders as previously illustrated and described, a cam $E_r$ may be mounted to swivel or rock between a pair of electrode holders D and D', as shown in Figs. 8 and 9. The cam is also located in a transversely extending slot 36', but has a pin 66 extending therethrough and into openings 68, 68' formed in the body 24" on opposite sides of the cam slot. The top of the cam is provided with a convex surface 70 and the cap 50" is formed with a corresponding concavity 72 to allow the cam to swing or rotate about the pin 66 between the holders. The opposite sides of the cam are provided with the cam faces $58_r$ for coaction with the cam faces 60 and 60' provided by each of the holders. The cam faces $58_r$ are preferably slightly convex in shape. Except for the rocking motion of the cam, the coaction thereof with the electrode holders and the translation of the welding pressure to the assembly into equal, parallel components of pressure upon the holders in the direction of welding pressure and in the directions transversely of welding pressure application are the same as previously described.

While the several multiple electrode holder embodiments of the invention which have been illustrated and described have the electrode holders in linear alignment with one another, it will be apparent that three or more electrode holders may be arranged on the outline of a circle or an ellipse if desired. The cam would then correspondingly be provided with radially extending cam faces for coaction with the cam faces provided by each of the holders in such an arrangement.

It is believed that the advantages of the invention will be apparent from the foregoing detailed description of several embodiments thereof. It will be apparent that various changes may be made without departing from the spirit and scope of the invention as sought to be defined in the following claims:

I claim:

1. A multiple electrode holder for simultaneously spot welding a plurality of spaced areas at substantially equal welding pressure, said multiple holder comprising a body having a plurality of spaced, parallel bores extending therethrough in a direction parallel to the direction of pressure application when welding, a resiliently mounted, piston-like electrode holder disposed in each of said bores and extending beyond the body at the work-engaging ends thereof, a transversely extending slot in said body in communication with said bores, and a pressure-equalizing cam in said slot for movement between and engagement by said holders.

2. A multiple electrode holder for simultaneously spot welding a plurality of spaced areas at substantially equal welding pressure and uniform distribution of current to such areas, said multiple holder comprising a body of electrically-conductive material having a plurality of spaced, parallel bores extending therethrough in a direction parallel to the direction of pressure application when welding, a resiliently mounted, piston-like electrode holder of electrically-conductive material disposed in each of said bores and extending beyond the body at the work-engaging ends thereof, a transversely extending slot in said body in communication with said bores, and a pressure-equalizing cam in said slot for movement between and engagement by said holders, the cam and the electrode holders being related so that upon the application of welding pressure to the body, the holders apply substantially equal pressure in the direction of welding and are pressed against the body in a direction transversely of the direction of welding at substantially equal pressure.

3. A multiple electrode holder as set forth in claim 2, wherein the cam is confined within the slot for linear movement between holders.

4. A multiple electrode holder as set forth in claim 2, wherein the cam is pivotally mounted to rock between holders.

5. A multiple electrode holder as set forth in claim 2, wherein one of the holders is insulated and provides a hold-down fixture.

6. A multiple electrode holder as set forth in claim 2, wherein one of the holders, which have welding tips secured thereto, is provided with an insulating cover over the tip to furnish a hold-down fixture.

7. A multiple electrode holder for simultaneously spot welding a plurality of spaced areas at substantially equal welding pressure and uniform distribution of current to such areas, said multiple holder comprising a body of electrically-conductive material having a plurality of spaced, parallel bores extending therethrough in a direction parallel to the direction of pressure application when welding, a closely fitting, piston-like electrode holder of electrically-conductive material disposed in each of said bores and extending beyond the body at the work-engaging ends thereof, said holders being resiliently urged in the direction of pressure application when welding, means limiting the movement of the resiliently mounted electrode holders in such direction, a transversely extending slot in said body in communication with said bores at the upper ends thereof, said holders each having a groove facing said slot and providing a cam surface extending from a point inward of the periphery of the electrode holder toward the periphery at an angle of between approximately 20 and 30 degrees with respect to the longitudinal axis of the holder, a pressure-equalizing cam member in said slot having tongue portions at the sides thereof received in said grooves and providing cam faces for coaction with the holder cam faces, and a cap of electrically-conductive material secured to said body and extending over the holders and the cam member, whereby upon the application of welding pressure and delivering current to the cap, the holders apply substantially equal pressure in the direction of welding and are pressed against the body in a direction transversely of the direction of welding at substantially equal pressure to permit conducting current uniformly to each of the spaced holders.

8. A multiple electrode holder as set forth in claim 7, wherein the cam faces of the cam member are formed to furnish a mating angle with respect to the angle of the cam faces of the holders, and the cam member is confined in the slot for linear movement between holders.

9. A multiple electrode holder as set forth in claim 7, wherein the cam is pivotally mounted to rock between holders.

10. A multiple electrode holder as set forth in claim 7, wherein one of the holders is insulated and provides a hold-down fixture.

11. A multiple electrode holder as set forth in claim 7, wherein one of the holders, which have welding tips secured thereto, is provided with an insulating cover over the tip to furnish a hold-down fixture.

12. A multiple electrode holder as set forth in claim 7, wherein there are more than two holders in spaced parallel and linear alignment and the number of cam members is one less than the number of holders.

References Cited in the file of this patent

UNITED STATES PATENTS 1,918,226    Gilbert _____ July 11, 1933

OTHER REFERENCES

Paper of the Office of Production Research and Development, M-56, "Device Holds Different Size Pieces for Milling," Dec. 10, 1944, sheet 3, relied on.